United States Patent
Sun et al.

(10) Patent No.: US 6,828,380 B2
(45) Date of Patent: Dec. 7, 2004

(54) THERMOPLASTIC MOLDING MATERIALS BASED ON SPECIAL GRAFT RUBBER COMPONENTS

(75) Inventors: Liqing-Lee Sun, Irvine, CA (US); Eckhard Wenz, Köln (DE); Herbert Eichenauer, Dormagen (DE); Stefan Moss, Haan (DE); Heinrich Alberts, Odenthal (DE); Hans-Bernhard Hauertmann, Dormagen (DE); Karl Zabrocki, Kaarst (DE); Hans-Erich Gasche, Odenthal (DE); Ulrich Jansen, Dormagen (DE)

(73) Assignee: Bayer Aktiengesellschaft, Leverkusen (DE)

(*) Notice: Subject to any disclaimer, the term of this patent is extended or adjusted under 35 U.S.C. 154(b) by 31 days.

(21) Appl. No.: 10/220,707

(22) PCT Filed: Feb. 6, 2001

(86) PCT No.: PCT/EP01/02217

§ 371 (c)(1),
(2), (4) Date: Nov. 21, 2002

(87) PCT Pub. No.: WO01/66641

PCT Pub. Date: Sep. 13, 2001

(65) Prior Publication Data

US 2003/0153678 A1 Aug. 14, 2003

(30) Foreign Application Priority Data

Mar. 9, 2000 (DE) .......................................... 100 11 544

(51) Int. Cl.$^7$ .............................................. C08L 55/02
(52) U.S. Cl. ............................ 525/64; 525/69; 525/71; 525/263; 525/333.5
(58) Field of Search .............................. 525/64, 69, 71, 525/263, 333.5, 343

(56) References Cited

U.S. PATENT DOCUMENTS

| | | | |
|---|---|---|---|
| 3,532,660 A | 10/1970 | Ott et al. | 260/31.2 |
| 5,552,465 A | 9/1996 | Witmann et al. | 524/139 |
| 5,674,940 A | * 10/1997 | Eichenauer et al. | 525/64 |
| 5,849,836 A | * 12/1998 | Wozny | 524/535 |
| 5,883,189 A | 3/1999 | Eichenauer et al. | 525/71 |

FOREIGN PATENT DOCUMENTS

| | | |
|---|---|---|
| CH | 499558 | 11/1979 |
| DE | 2 101 650 | 7/1971 |
| DE | 37 30 205 | 3/1989 |
| EP | 0 540 470 | 5/1993 |
| EP | 0 745 524 | 12/1996 |
| GB | 1009655 | 11/1965 |
| WO | 00/04067 | 1/2000 |

* cited by examiner

*Primary Examiner*—James J. Seidleck
*Assistant Examiner*—Olga Asinovsky
(74) *Attorney, Agent, or Firm*—Jill Denesvich; Godfried R. Akorli

(57) ABSTRACT

A molding composition having good surface gloss, high elongation at break and good thermoplastic processability is disclosed. The composition contains (A) a graft polymer that is obtained by free-radical polymerization of resin-forming vinyl monomers in the presence of rubber in latex form, (B) a copolymer of styrene and acrylonitrile and an optional (C) a resin selected from the group consisting of polycarbonates, polyester-carbonates, polyesters and polyamides. The preparation of the graft polymer is characterized in that (i) before the start of the grafting polymerization reaction the rubber latex is brought to a pH of 9 to 11, (ii) the redox initiator components are employed in amounts of 0.1 to 2.5 wt. % (based on the monomers metered in) and (iii) during the entire grafting polymerization reaction the pH remains constant±0.5 and in the range of 11.0 to 8.8, and (iv) the temperature difference between the start and end of the reaction is at least 10° C.

14 Claims, No Drawings

THERMOPLASTIC MOLDING MATERIALS BASED ON SPECIAL GRAFT RUBBER COMPONENTS

The invention provides thermoplastic moulding compositions of the ABS type and of the ABS blend type comprising improved graft rubber components, which are obtained by emulsion polymerization while maintaining defined reaction conditions.

Moulding compositions of the ABS type are two-phase plastics of

I) a thermoplastic copolymer, in particular of styrene and acrylonitrile, in which all or some of the styrene can be replaced by β-methylstyrene or methyl methacrylate; this copolymer, also called SAN resin or matrix resin, forms the external phase;
II) at least one graft polymer which has been prepared by a grafting reaction of one or more of the monomers mentioned under I on a butadiene homo- or copolymer ("graft base"). This graft polymer ("elastomer phase" or "graft rubber") forms the disperse phase in the matrix resin.

These mixtures of plastics can additionally also comprise other polymer components, such as e.g. aromatic polycarbonate resins, polyester-carbonate resins, polyester resins or polyamide resins, as a result of which so-called ABS blend systems are obtained.

Graft rubbers prepared using redox initiator systems have proved particularly suitable as impact modifiers both for ABS moulding compositions and for ABS blend systems (see e.g. EP-A 482 451 and the literature cited there), as a rule good impact strengths being achieved. A disadvantage is that the surface gloss, elongation at break and thermoplastic flow properties are often not adequate or are subject to wide variations.

Graft rubbers prepared by redox initiation moreover tend towards an increased content of unreacted monomers, which can indeed be decreased by addition of metal ions (e.g. Fe ions) in the reaction mixture, but this leads to sacrifices in other properties (e.g. heat stability, colour of the polymers).

DE-A 2,101,650 describes a rubber latex obtained by the agglomeration of a starting latex. Example 2 describes a process for the production of a polybutadiene latex grafted with styrene and acrylonitrile by emulsion polymerization using a redox initiator (Fe(II)/cumene hydroperoxide), the rubber latex being adjusted to a pH value of 10 before the beginning of the graft polymerization reaction. Example 2 does not contain any suggestion that if reaction conditions according to the subject matter of the invention are adhered to graft polymers having a low residual monomer content of styrene would result and display excellent mechanical properties, in particular impact strength and elongation at break.

EP-A 540 470 describes a process for the production of graft polymers by emulsion polymerization in the presence of iron(II) redox systems as the catalyst and subsequent coagulation of the graft polymer latex with alkaline earth metal compounds, the pH of the coagulated slurry being in the range of 8 to 12. It is clear from Examples III and IV that the pH value of 7.2 increases due to the addition of KOH and at the end of the reaction a pH value of 9.2 is reached.

DE-A 37 30 205 describes a process for the production of graft polymers on acrylate rubber, an initiator system of organic hydroperoxide and ascorbic acid being used and the pH value during the graft polymerization being lower than 11.

DE-A 1 98 31 735 describes thermoplastic moulding compounds of the ABS type which are produced by the specified feed of the monomer into the rubber latex using persulphate compounds.

In none of the abovementioned references is it stated that the production takes place inter alia by keeping the pH value constant (within the normal range of variation of approx. ±0.5 units) and that graft polymers with a low residual monomer content of styrene result.

There is therefore a need for graft rubbers which do not have these disadvantages and for a process by which ABS and ABS blend moulding compositions can be prepared without the disadvantages mentioned.

It has now been found that moulding compositions with a very good surface gloss, high elongation at break and good thermoplastic processability can be obtained without an adverse influence on the other properties if the preparation of the graft rubber employed is carried out while maintaining precisely defined reaction conditions.

The invention provides compositions of the ABS type and of the ABS blend type comprising A) at least one elastic-thermoplastic graft polymer obtained by free-radical emulsion polymerization of resin-forming vinyl monomers, preferably of compounds of the formulae (I) and (II) described below, particularly preferably of styrene and/or acrylonitrile, it being possible for all or some of the styrene and/or acrylonitrile to be replaced by α-methylstyrene, methyl methacrylate or N-phenylmaleimide or mixtures thereof, in the presence of rubber which is in latex form and has a glass transition temperature of $\leq 0°$ C., using a redox initiator system and
B) at least one copolymer of styrene and acrylonitrile, it being possible for all or some of the styrene and/or acrylonitrile to be replaced by α-methylstyrene or methyl methacrylate or N-phenylmaleimide or mixtures thereof and optionally
C) a resin chosen from the group consisting of polycarbonates, polyester-carbonates, polyesters and polyamides or mixtures thereof, characterized in that the preparation of the graft polymer A) is carried out by a procedure in which before the start of the grafting polymerization reaction the rubber latex is brought to a pH of 9 to 11, preferably 9.5 to 10.5 and particularly preferably 9.7 to 10.3, the redox initiator components are employed in amounts of 0.1 to 2.5 wt. %, preferably 0.2 to 2.0 wt. % and particularly preferably 0.5 to 1.5 wt. % (in each case based on the monomers metered in) and during the entire grafting polymerization reaction the pH should not exceed a value of 11.0, preferably 10.8, and should not fall below a value of 8.8, preferably 9.0, the pH remains constant during the entire reaction within the normal range of variation (approx. ±0.5 units) and the temperature difference between the start and end of the reaction is at least 10° C., preferably at least 15° C. and particularly preferably at least 20° C.

With the aid of the process according to the invention graft polymers are obtained with a residual monomer content of styrene of less than 2500 ppm, preferably less than 2000 ppm, and in particular less than 1600 ppm (based on the resulting graft polymer). It is clear from the examples that where deviations occur from the reaction conditions to be adhered to according to the description of the process graft polymers with high residual monomer contents of styrene are obtained Suitable rubbers for the preparation of the elastic-thermoplastic graft polymers according to the invention are in principle all rubber-like polymers which are in emulsion form and have a glass transition temperature below 0° C.

Polymers which can preferably be used are e.g.

diene rubbers, i.e. homopolymers of conjugated dienes having 4 to 8 C atoms, such as butadiene, isoprene, chloroprene or copolymers thereof with up to 60 wt. %, preferably up to 30 wt. % of a vinyl monomer, e.g. acrylonitrile, methacrylonitrile, styrene, α-methylstyrene, halogenostyrenes, $C_1$–$C_4$-alkyl-styrenes, $C_1$–$C_8$-alkyl acrylates, $C_1$–$C_8$-alkyl methacrylates, alkylene glycol diacrylates, alkylene glycol dimethacrylates or divinylbenzene;

acrylate rubbers, i.e. homo- and copolymers of $C_1$–$C_{10}$-alkyl acrylates, e.g. homopolymers of ethyl acrylate or butyl acrylate or copolymers with up to 40 wt. %, preferably not more than 10 wt. % of mono-vinyl monomers, e.g. styrene, acrylonitrile, vinyl butyl ether, acrylic acid (esters), methacrylic acid (esters) or vinylsulfonic acid. Those acrylate rubber homo- or copolymers which comprise 0.01 to 8 wt. % of divinyl or polyvinyl compounds and/or N-methylolacrylamide or N-methylolmethacrylamide or other compounds which act as crosslinking agents, e.g. divinylbenzene or triallyl cyanurate, are preferably employed.

Preferred rubbers are polybutadiene rubbers, SBR rubbers with up to 30 wt. % of polymerized-in styrene and acrylate rubbers, in particular those which have a core-shell structure, e.g. as described in DE-A 3 006 804.

Latices with average particle diameters $d_{50}$ of 0.05 to 2.0 μm, preferably 0.08 to 1.0 μm and particularly preferably 0.1 to 0.5 μm are possible for the preparation of the graft polymers according to the invention. The gel contents of the rubbers employed can be varied within wide limits, and are preferably between 30 and 95 wt. % (determination by the wire cage method in toluene (cf. Houben-Weyl, Methoden der Organischen Chemie, Makromolekulare Stoffe, part 1, p. 307 (1961), Thieme Verlag Stuttgart)).

Mixtures of rubber latices with a) average particle diameters $d_{50}$ of $\leq$320 nm, preferably 260 to 310 nm, and gel contents of $\leq$70 wt. %, preferably 40 to 65 wt. % and b) average particle diameters $d_{50}$ of $\geq$370 nm, preferably 380 to 450 nm, and gel contents of $\geq$70 wt. %, preferably 75 to 90 wt. %, are very particularly preferred.

Rubber latex (a) here preferably has a range of the particle size distribution of 30 to 100 nm, particularly preferably 40 to 80 nm, and rubber latex (b) 50 to 500 nm, particularly preferably 100 to 400 nm (in each case measured as the $d_{90}$–$d_{10}$ value from the integral particle size distribution).

The mixtures preferably comprise the rubber latices (a) and (b) in a weight ratio of 90:10 to 10:90, particularly preferably 60:40 to 30:70 (in each case based on the particular solids content of the latices).

The average particle diameters are determined by means of an ultracentrifuge (cf. W. Scholtan, H. Lange: Kolloid-Z. u. Z. Polymere 250, p. 782–796 (1972)).

The values stated for the gel content are based on determination by the wire cage method in toluene (cf. Houben-Weyl, Methoden der Organischen Chemie, Makromolekulare Stoffe, part 1, p. 307 (1961), Thieme Verlag Stuttgart).

The rubber latices used can be prepared by emulsion polymerization, and the required reaction conditions, auxiliary substances and working techniques are known in principle.

It is also possible first to prepare a fine-particled rubber polymer by known methods and then to agglomerate it in a known manner to establish the required particle size. Relevant techniques are described (cf. EP-A 0 029 613; EP-A 0 007 810; DD-A 144 415; DE-A 12 33 131; DE-A 12 58 076; DE-A 21 01 650 and U.S. Pat. No. 1,379,391).

It is also possible to use the so-called seed polymerization technique, in which e.g. a fine-particled butadiene polymer is first prepared and is then polymerized further to larger particles by further reaction with monomers containing butadiene.

Emulsifiers which can be used are the conventional anionic emulsifiers, such as alkyl sulfates, alkylsulfonates, aralkylsulfonates and soaps of saturated or unsaturated fatty acids (e.g. oleic acid or stearic acid) and of abietic or tall oil acid disproportionated under alkaline conditions or hydrogenated, and emulsifiers with a carboxyl group (e.g. salts of $C_{10}$–$C_{18}$-fatty acids, disproportionated abietic acid or emulsifiers according to DE-A 36 39 904 and DE-A 39 13 509) are preferably employed.

Rubber polymer latices can in principle also be prepared by emulsifying ready-made rubber polymers in aqueous media (cf. Japanese Patent Application JP-A 55 125 102).

Suitable grafting monomers which are polymerized in the presence of the rubber-like polymers in emulsion form are practically all compounds which can be polymerized in emulsion to give thermoplastic resins, e.g. vinylaromatics of the formula (I) or compounds of the formula (II) or mixtures thereof

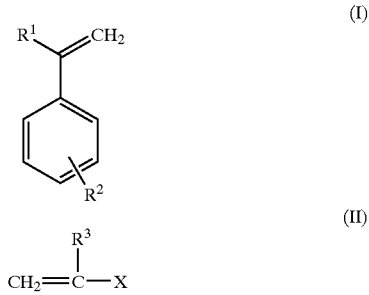

in which $R^1$ represents hydrogen or methyl, $R^2$ represents hydrogen, halogen or alkyl having 1 to 4 carbon atoms in the ortho-, meta- or para-position, $R^3$ represents hydrogen or methyl and X represents CN, $R^4$OOC or $R^5R^6$NOC, wherein $R^4$ denotes hydrogen or alkyl having 1 to 4 carbon atoms; and $R^5$ and $R^6$ independently of one another denote hydrogen, phenyl or alkyl having 1 to 4 carbon atoms.

Examples of compounds of the formula (I) are styrene, α-methylstyrene, p-methyl-styrene and vinyltoluene. Compounds of the formula (II) are acrylonitrile and methyl methacrylate. Further monomers which are suitable in principle are e.g. vinyl acetate and N-phenylmaleimide.

Preferred monomers are mixtures of styrene and acrylonitrile, α-methylstyrene and acrylonitrile and of styrene, acrylonitrile and methyl methacrylate, and combinations of these monomer mixtures with N-phenylmaleimide.

Preferred graft polymers A) according to the invention are those which are obtained by grafting polymerization of styrene and acrylonitrile in a wt. ratio of 90:10 to 50:50, preferably 80:20 to 65:35 (it being possible for all or some of the styrene to be replaced by α-methylstyrene or methyl methacrylate), in the presence of amounts of rubber, preferably polybutadiene, such that graft polymers with rubber contents of 20 to 80 wt. %, preferably 30 to 75 wt. % and particularly preferably 35 to 70 wt. % result.

Redox initiator systems which are suitable according to the invention as a rule comprise an organic oxidizing agent and a reducing agent, it being possible for heavy metal ions additionally to be present in the reaction medium; the reaction is preferably carried out without heavy metal ions.

Organic oxidizing agents which are suitable according to the invention are, for example and preferably, di-tert-butyl peroxide, cumene hydroperoxide, dicyclohexyl percarbonate, tert-butyl hydroperoxide, p-methane hydroperoxide or mixtures thereof, and cumene hydroperoxide and tert-butyl hydroperoxide are particularly preferred. $H_2O_2$ can also be used.

Reducing agents which can be employed according to the invention are, preferably, water-soluble compounds with a reducing action, preferably chosen from the group consisting of salts of sulfinic acid, salts of sulfurous acid, sodium dithionite, sodium sulfite, sodium hyposulfite, sodium hydrogen sulfite, ascorbic acid and salts thereof, Rongalit C (sodium formaldehyde-sulfoxylate), mono- and dihydroxyacetone and sugars (e.g. glucose or dextrose). In principle it is also possible to use e.g. iron(II) salts, such as e.g. iron(II) sulfate, tin(II) salts, such as e.g. tin(II) chloride, and titanium (III) salts, such as titanium(II) sulfate; preferably, however, no such metal salts are used.

Particularly preferred reducing agents are dextrose, ascorbic acid (salts) or sodium formaldehyde-sulfoxylate (Rongalit C).

The amount of redox initiator component is divided into oxidizing and reducing agent as follows:

The amount of oxidizing agent employed is in general 0.05 to 2.0 wt. %, preferably 0.1 to 1.5 wt. % and particularly preferably 0.2 to 1.2 wt. %. The amount of reducing agent is in general 0.05 to 1.5 wt. %, preferably 0.08 to 1.2 wt. % and particularly preferably 0.1 to 1.0 wt. %.

The redox initiator components are conventionally employed in the form of aqueous solution, aqueous emulsions, aqueous suspension or other aqueous dispersions.

The invention also provides a process for the preparation of graft rubbers by emulsion polymerization using a redox initiator system, wherein i) before the start of the grafting polymerization reaction the rubber latex is brought to a pH of 9 to 11, preferably 9.5 to 10.5 and particularly preferably 9.7 to 10.3,
ii) the grafting monomers are metered into the rubber latex,
iii) the redox initiator components are added in amounts of 0.1 to 2.5 wt. %, preferably 0.2 to 2 wt. % and particularly preferably 0.5 to 1.5 wt. % (in each case based on the monomers metered in) and
iv) during the entire grafting polymerization reaction the pH is kept between 11.0 and 8.8, preferably between 10.8 and 9.0, the pH remains constant during the reaction within a range of variation of ±0.5 units, and a temperature difference between the start and end of the reaction of at least 10° C., preferably at least 15° C. and particularly preferably at least 20° C. is maintained.

The reaction temperature in the preparation according to the invention of the graft rubbers A) can be varied within wide limits. It is in general 25° C. to 160° C., preferably 40° C. to 90° C. and particularly preferably 60° C. to 85° C. The grafting polymerization is carried out here such that the temperature difference between the start and end of the reaction is at least 10° C., preferably at least 15° C. and particularly preferably at least 20° C.

Molecular weight regulators can additionally be employed in the grafting polymerization, preferably in amounts of 0.05 to 2 wt. %, particularly preferably in amounts of 0.1 to 1 wt. % (in each case based on the total amount of monomer).

Suitable molecular weight regulators are, for example, n-dodecylmercaptan, t-dode-cylmercaptan, dimeric α-methylstyrene, terpinols and mixture combinations of these compounds.

The above-mentioned compounds can be employed as the emulsifier in the grafting polymerization reaction.

The graft rubber latex A) is worked up by known processes, for example by spray drying or by addition of salts and/or acids, washing of the precipitated products and drying of the powder.

Vinyl resins B) which are preferably employed are copolymers of styrene and acrylonitrile in a weight ratio of 90:10 to 50:50, it being possible for all or some of the styrene and/or acrylonitrile to be replaced by α-methylstyrene and/or methyl methacrylate; a proportion of up to 30 wt. % (based on the vinyl resin) of a further monomer from the series consisting of maleic anhydride, maleimide, N-(cyclo)-alkylmaleimide and N-(alkyl)-phenylmaleimide can optionally be co-used.

The weight-average molecular weight ($\overline{M}_w$) of these resins can be varied within wide limits, and are preferably between approx. 40,000 and 200,000, particularly preferably between 50,000 and 150,000.

Details of the preparation of these resins are described, for example, in DE-A 2 420 358 and DE-A 2 724 360. Resins prepared by bulk or solution polymerization and by suspension polymerization have proved to be particularly suitable.

The content of elastic-thermoplastic graft polymer (A) in the moulding compositions according to the invention can be varied within wide limits; it is preferably 1 to 80 wt. %, particularly preferably 5 to 50 wt. %.

The required or expedient additives, e.g. antioxidants, UV stabilizers, peroxide destroyers, antistatics, lubricants, mould release agents, flameproofing agents, fillers or reinforcing substances (glass fibres, carbon fibres etc.) and colouring agents, can be added to the moulding compositions according to the invention during preparation, working up, further processing and final shaping.

The final shaping can be carried out on commercially available processing units and comprises e.g. processing by injection moulding, sheet extrusion with optional subsequent thermoforming, cold forming, extrusion of pipes and profiles or processing on a calender.

The moulding compositions according to the invention of the ABS type can be mixed with other polymers (component C). Suitable blend partners are chosen, for example, from at least one polymer chosen from the group consisting of poly-carbonates, polyesters, polyester-carbonates and polyamides.

Suitable thermoplastic polycarbonates and polyester-carbonates are known (cf. e.g. DE-A 1 495 626, DE-A 2 232 877, DE-A 2 703 376, DE-A 2 714 544, DE-A 3 000 610, DE-A 3 832 396 and DE-A 3 077 934), e.g. can be prepared by reaction of diphenols of the formulae (III) and/or (IV)

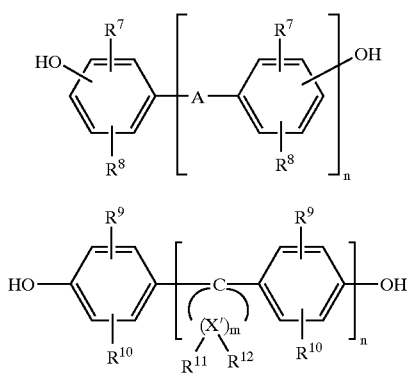

(III)

(IV)

wherein

A is a single bond, $C_1$–$C_5$-alkylene, $C_2$–$C_5$-alkylidene, $C_5$–$C_6$-cycloalkylidene, —O—, —S—, —SO—, —SO$_2$— or —CO—, $R^7$ and $R^8$ independently of one another represent hydrogen, methyl or halogen, in particular hydrogen, methyl, chlorine or bromine, $R^9$ and $R^8$ independently of one another denote hydrogen, halogen, preferably chlorine or bromine, $C_1$–$C_8$-alkyl, preferably methyl or ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, in particular benzyl, m is an integer from 4 to 7, preferably 4 or 5, n is 0 or 1, $R^{11}$ and $R^{12}$ can be chosen individually for each X and independently of one another denote hydrogen or $C_1$–$C_6$-alkyl and X' denotes carbon with carbonic acid halides, preferably phosgene, and/or with aromatic dicarboxylic acid dihalides, preferably benzenedicarboxylic acid dihalides, by phase boundary polycondensation, or with phosgene by polycondensation in a homogeneous phase (the so-called pyridine process), it being possible to adjust the molecular weight in a known manner by an appropriate amount of known chain terminators.

Suitable diphenols of the formulae (III) and (IV) are e.g. hydroquinone, resorcinol, 4,4'-dihydroxydiphenyl, 2,2-bis-(4-hydroxyphenyl)-propane, 2,4-bis-(4-hydroxy-phenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of the formula (III) are 2,2-bis-(4-hydroxyphenyl)-propane and 1,1-bis-(4-hydroxyphenyl)-cyclohexane, and the preferred phenol of the formula (IV) is 1,1-bis-(4-hydroxyphenyl)-3,3,5-trimethylcyclohexane.

Mixtures of diphenols can also be employed.

Suitable chain terminators are e.g. phenol, p-tert-butylphenol, long-chain alkyl-phenols, such as 4-(1,3-tetramethyl-butyl)phenol according to DE-A 2 842 005, and monoalkylphenols and dialkylphenols having a total of 8 to 20 C atoms in the alkyl substituents according to DE-A 3 506 472, such as p-nonylphenol, 2,5-di-tert-butylphenol, p-tert-octylphenol, p-dodecylphenol, 2-(3,5-dimethylheptyl)-phenol and 4-(3,5-dimethylheptyl)-phenol. The required amount of chain terminators is in general 0.5 to 10 mol %, based on the sum of diphenols (II) and (IV).

The suitable polycarbonates and polyester-carbonates can be linear or branched; branched products are preferably obtained by incorporation of 0.05 to 2.0 mol %, based on the sum of the diphenols employed, of compounds which are trifunctional or more than trifunctional, e.g. those with three or more than three phenolic OH groups.

The suitable polycarbonates and polyester-carbonates can contain aromatically bonded halogen, preferably bromine and/or chlorine; they are preferably halogen-free.

They have average molecular weights ($\overline{M}_w$, weight-average), determined e.g. by ultracentrifugation or scattered light measurement, of 10,000 to 200,000, preferably 20,000 to 80,000.

Suitable thermoplastic polyesters are, preferably, polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of such reaction products.

Preferred polyalkylene terephthalates can be prepared by known methods from terephthalic acids (or their reactive derivatives) and aliphatic or cycloaliphatic diols having 2 to 10 C atoms (Kunststoff-Handbuch, volume VIII, p. 695 et seq., Carl Hanser Verlag, Munich 1973).

In preferred polyalkylene terephthalates, 80 to 100, preferably 90 to 100 mol % of the dicarboxylic acid radicals are terephthalic acid radicals and 80 to 100, preferably 90 to 100 mol % of the diol radicals are ethylene glycol and/or butane-1,4-diol radicals.

The preferred polyalkylene terephthalates can contain, in addition to ethylene glycol radicals and butane-1,4-diol radicals, 0 to 20 mol % of radicals of other aliphatic diols having 3 to 12 C atoms or cycloaliphatic diols having 6 to 12 C atoms, e.g. radicals of propane-1,3-diol, 2-ethylpropane-1,3-diol, neopentylglycol, pentane-1,5-diol, hexane-1,6-diol, cyclohexane-1,4-dimethanol, 3-methylpentane-1,3-diol and-1,6-diol, 2-ethylhexane-1,3-diol, 2,2-diethylpropane-1,3-diol, hexane-2,5-diol, 1,4-di(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-A 2 407 647, 2 407 776 and 2 715 932).

The polyalkylene terephthalates can be branched by incorporation of relatively small amounts of 3- or 4-hydric alcohols or 3- or 4-basic carboxylic acids, such as are described in DE-A 1 900 270 and U.S. Pat. No. 3,692,744. Examples of preferred branching agents are trimesic acid, trimellitic acid, trimethylolethane and -propane and pentaerythritol. It is advisable to use not more than 1 mol % of the branching agent, based on the acid component.

Polyalkylene terephthalates which have been prepared solely from terephthalic acid and reactive derivatives thereof (e.g. dialkyl esters thereof) and ethylene glycol and/or butane-1,4-diol and mixtures of these polyalkylene terephthalates are particularly preferred.

Preferred polyalkylene terephthalates are also copolyesters which are prepared from at least two of the abovementioned alcohol components; particularly preferred copolyesters are poly-(ethylene glycol-butane-1,4-diol) terephthalates.

The polyalkylene terephthalates which are preferably suitable in general have an intrinsic viscosity of 0.4 to 1.5 dl/g, preferably 0.5 to 1.3 dl/g, in particular 0.6 to 1.2 dl/g, in each case measured in phenol/o-dichlorobenzene (1:1 parts by wt.) at 25° C.

Suitable polyamides are known homopolyamides, copolyamides and mixtures of these polyamides. These can be partly crystalline and/or amorphous polyamides.

Suitable partly crystalline polyamides are polyamide 6, polyamide 6,6 and mixtures and corresponding copolymers of these components. Partly crystalline polyamides which are furthermore possible are those in which the acid component consists entirely or partly of terephthalic acid and/or isophthalic acid and/or suberic acid and/or sebacic acid and/or azelaic acid and/or adipic acid and/or cyclohexane-dicarboxylic acid and in which the diamine component consists entirely or partly of m- and/or p-xylylene-diamine and/or hexamethylenediamine and/or 2,2,4-trimethylhexamethylenediamine and/or 2,4,4-trimethylhexamethylenediamine and/or isophoronediamine, the composition of which is known in principle.

Polyamides which are prepared entirely or partly from lactams having 7–12 C atoms in the ring, optionally co-using one or more of the abovementioned starting components, may moreover be mentioned.

Particularly preferred partly crystalline polyamides are polyamide 6 and polyamide 6,6 and their mixtures. Known products can be employed as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids, such as oxalic acid, adipic acid, azelaic acid, decanedicarboxylic acid, heptadecanedicarb-oxylic acid, 2,2,4- and/or 2,4,4-trimethyladipic acid, isophthalic acid and terephthalic acid.

Copolymers which are obtained by polycondensation of several monomers are also suitable, and furthermore copolymers which are prepared with the addition of aminocarboxylic acids, such as ε-aminocaproic acid, ω-aminoundecanoic acid or ω-aminolauric acid or their lactams.

Particularly suitable amorphous polyamides are the polyamides prepared from isophthalic acid, hexmethylenediamine and further diamines, such as 4,4'-diamino-dicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and 6-caprolactam, or from isophthalic acid, 3,3'-dimethyl-4,4'-diamino-dicyclohexylmethane and lauryllactam; or from terephthalic acid and the isomer mixture of 2,2,4- and/or 2,4,4-trimethylhexamethylene-diamine.

Instead of pure 4,4'-diaminodicyclohexylmethane, it is also possible to employ mixtures of the diaminodicyclohexylmethane position isomers, which are composed of 70 to 99 mol % of the 4,4'-diamino isomer
1 to 30 mol % of the 2,4'-diamino isomer
0 to 2 mol % of the 2,2'-diamino isomer and optionally correspondingly more highly condensed diamines, which are obtained by hydrogenation of diaminodiphenylmethane of technical-grade quality. Up to 30% of the isophthalic acid can be replaced by terephthalic acid.

The polyamides preferably have a relative viscosity (measured on a 1 wt. % solution in m-cresol at 25° C.) of 2.0 to 5.0, particularly preferably 2.5 to 4.0.

If at least one polymer chosen from the group consisting of polycarbonates, polyesters, polyester-carbonates and polyamides is additionally used, the amount thereof is up to 500 parts by wt., preferably up to 400 parts by wt. and particularly preferably up to 300 parts by wt. (in each case based on 100 parts by wt. of A+B).

In the following examples the parts stated are always parts by weight and the % stated are always wt. %, unless indicated otherwise.

EXAMPLES

Example 1

According to the Invention 58.5 parts by wt. (calculated as the solid) of a polybutadiene latex mixture (50% with an average particle diameter $d_{50}$ of 423 nm and a gel content of 82 wt. % and 50% with an average particle diameter $d_{50}$ of 288 nm and a gel content of 56 wt. %, both prepared by free-radical polymerization) are brought to a solids content of approx. 20 wt. % with water. The pH, which is then 12.2, is brought to 10.0 by addition of dilute sulfuric acid, after which the mixture is heated to 75° C. Thereafter, in the course of 480 minutes, in parallel, 0.26 part by wt. of tert-butyl hydroperoxide and 0.22 part by wt. of sodium ascorbate and in the course of 240 minutes 41.5 parts by wt. of a monomer mixture (styrene/acrylonitrile=73:27) are metered in, the temperature being kept at 75° C. during the first 4 h and then being raised to 85° C. In parallel with the monomers, 1.72 parts by wt. (calculated as the solid substance) of the sodium salt of a resin acid mixture (Dresinate 731, Abieta Chemie GmbH, Gersthofen) are metered in over a period of 4 h.

After an after-reaction time of one hour at 85° C., the latex is cooled to 23° C. (final pH 9.9); the residual monomers are then determined by gas chromatography by the head space technique:

| | |
|---|---|
| Styrene: | 2,050 ppm |
| Acrylonitrile: | 230 ppm |

Thereafter, after addition of approx. 1 part by wt. of a phenolic antioxidant, the graft latex is coagulated with a magnesium sulfate/acetic acid mixture and, after washing with water, the resulting powder is dried at 70° C.

Example 2

Comparison

Example 1 is repeated, the pH being brought to 11.8 before the start of the reaction. All further measures are carried out analogously to example 1 (final pH 9.6).

Residual monomers:

| | |
|---|---|
| Styrene: | 5,310 ppm |
| Acrylonitrile: | 580 ppm |

Example 3

Comparison

Example 1 is repeated, the pH being brought to 8.5 before the start of the reaction. The latex coagulates after a reaction of approx. 40 min.

Example 4

According to the Invention

Example 1 is repeated, 0.1 ppm $Fe^{2+}$ ions (in the form of $FeSO_4$/EDTA complex) being added before the pH adjustment and the temperature being kept at 62° C. during the first 4 h.

All further measures are carried out analogously to example 1 (final pH 10.0).

Residual monomers:

| | |
|---|---|
| Styrene: | 1,860 ppm |
| Acrylonitrile: | 130 ppm |

Example 5

Comparison

Example 4 is repeated, the pH being brought to 11.5 before the start of the reaction (final pH 9.6).

Residual monomers:

| | |
|---|---|
| Styrene: | 2,980 ppm |
| Acrylonitrile: | 170 ppm |

Example 6

According to the Invention

Example 1 is repeated, 0.05 part by wt. potassium peroxodisulfate (in the form of an aqueous solution) being added before the pH adjustment and the temperature being kept at 70° C. during the first 4 h. All further measures are carried out analogously to example 1 (final pH 9.4).

Residual monomers:

| | |
|---|---|
| Styrene: | 1,440 ppm |
| Acrylonitrile: | 130 ppm |

Example 7

Comparison

Example 6 is repeated, the pH being brought to 11.5 before the start of the reaction (final pH 9.8)

Residual monomers:

| | |
|---|---|
| Styrene: | 6,650 ppm |
| Acrylonitrile: | 560 ppm |

Preparation and Testing of the Moulding Compositions 23.8 parts by wt. of the graft polymers obtained in the abovementioned examples are mixed in an internal kneader with 32.7 parts by wt. of a styrene/acrylonitrile=72:28 copolymer resin ($\overline{M}_w \approx 85{,}000$), 42.6 parts by wt. of a linear aromatic polycarbonate of 2,2-bis-(4-hydroxyphenyl)-propane (bisphenol A) with a relative viscosity of 1.26 (measured in $CH_2Cl_2$ at 25° C. in the form of a 0.5 wt. % solution), corresponding to an $\overline{M}_w$ of approx. 25,000, and 0.75 part by wt. pentaerythritol tetrastearate and the mixture is then processed to test specimens at 260° C., The notched impact strength is determined in accordance with the method of ISO 180 1A on bars of dimensions 80×10×4 at room temperature.

The elongation at break DR is determined in the context of determination of the modulus of elasticity in tension in accordance with the method of ISO 527 on F3 dumbbell-shaped bars.

The melt flow properties MVR are determined in accordance with the method of DIN 53 753 at 260° C. (5 kg load).

As can be seen from table 1, the moulding compositions according to the invention have improved properties, in particular higher flow properties and higher elongation at break values.

All the moulding compositions led to mouldings with a high uniform surface gloss.

TABLE 1

Compositions and properties of the polycarbonate-ABS moulding compositions

| Example | Graft polymer employed from example | $a_k$ RT (kJ/m$^2$) | DR (%) | MVR (cm$^3$/10 min) |
|---|---|---|---|---|
| 8 | 1 | 60 | 37 | 7.1 |
| 9 (comparison) | 2 | 61 | 27 | 4.9 |
| 10 | 4 | 61 | 48 | 9.1 |
| 11 (comparison) | 5 | 67 | 44 | 5.8 |
| 12 | 6 | 60 | 31 | 9.6 |
| 13 (comparison) | 7 | 46 | 31 | 5.3 |

What is claimed is:

1. Composition comprising
   A) at least one elastic-thermoplastic graft polymer obtained by free-radical emulsion polymerization of resin-forming vinyl monomers in the presence of rubber which is in latex form and has a glass transition temperature of ≦0° C., using a redox initiator system and
   B) at least one copolymer built up from styrene and acrylonitrile and optionally further comonomers
   and optionally
   C) a resin chosen from the group consisting of polycarbonates, polyester-carbonates, polyesters and polyamides,
   characterized in that the preparation of the graft polymer A) is carried out by a procedure in which before the start of the grafting polymerization reaction the rubber latex is brought to a pH of 9 to 11 and the pH remains constant during the reaction within a range of variation of ±0.5 units, the redox initiator components are employed in amounts of 0.1 to 2.5 wt. % (based on the monomers metered in) and during the entire grafting polymerization reaction the pH should not exceed a value of 11.0 and should not fall below a value of 8.8, and the temperature difference between the start and end of the reaction is at least 10° C.

2. Composition according to claim 1 comprising a graft polymer with a residual monomer content of styrene of less than 2500 ppm.

3. Composition according to claim 1 characterized in that it comprises component A) in amounts of 1 to 80 wt. %.

4. Composition according to claim 1 characterized in that a mixture of at least two rubber latices with
   a) an average particle diameter $d_{50}$ of ≦320 nm and a gel content of ≦70 wt. % and b) an average particle diameter $d_{50}$ of $\geq 370$ nm and a gel content of $\geq 70$ wt. % is employed.

5. Composition according to claim 1 characterized in that the elastic-thermoplastic graft polymer A) has a rubber content of 20 to 80 wt. %.

6. Composition according to claim 1 characterized in that the resin-forming monomers in component A) are compounds of the formula (I) or (II) or mixtures thereof:

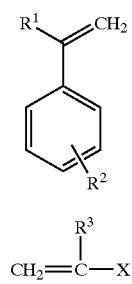

in which
$R^1$ represents hydrogen or methyl,
$R^2$ represents hydrogen, halogen or alkyl having 1 to 4 carbon atoms in the ortho-, meta- or para-position,
$R^3$ represents hydrogen or methyl and
X represents CN, $R^4$OOC or $R^5R^6$NOC.
wherein
$R^4$ denotes hydrogen or alkyl having 1 to 4 carbon atoms; and
$R^5$ and $R^6$ independently of one another denote hydrogen, phenyl or alkyl having 1 to 4 carbon atoms.

7. Composition according to claim 1 characterized in that the redox initiator system for the preparation of graft polymer A) is at least one member selected from the group consisting of di-tert-butyl peroxide, cumene hydroperoxide, dicyclohexyl percarbonate, tert-butyl hydroperoxide, p-menthane hydroperoxide and $H_2O_2$ as the oxidizing component and at least one water-soluble compound with a reducing action as the reducing component.

8. Composition according to claim 7, wherein the oxidizing agent is at least one member selected from the group consisting of cumene hydroperoxide, tert-butyl hydroperoxide and p-methane hydroperoxide.

9. Composition according to claim 7, wherein the reducing agent is a member selected from the group consisting of salts of sulfinic acid, salts of sulfurous acid, sodium dithionite, sodium sulfite, sodium hyposulfite, sodium hydrogen sulfite, ascorbic acid and salts thereof, Rongalit C (sodium formaldehyde-sulfoxylate), mono- and dihydroxyacetone, sugars, iron(II) salts, tin(II) salts and titanium(III) salts.

10. Composition according to claims 9, wherein the reducing agent is at least one member selected from the group consisting of dextrose, ascorbic acid and salts thereof and sodium formaldehyde-sulfoxylate.

11. Composition according to claim 1 characterized in that copolymer B) is built up from at least one member selected from the group consisting of styrene, (α-methylstyrene, acrylonitrile, methyl methacrylate, maleic anhydride and N-phenylmaleimide.

12. Composition according to claim 1 additionally comprising at least one resin selected from the group consisting of polycarbonates, polyester-carbonates, polyesters and polyamides.

13. Process for the preparation of rubber-containing graft polymers by emulsion polymerization using a redox initiator system, characterized in that i) before the start of the grafting polymerization reaction the rubber latex is brought to a pH of 9 to 11, ii) the grafting monomers are metered into the rubber latex, iii) the redox initiator components are added in amounts of 0.1 to 2.5 wt. % and iv) during the entire grafting polymerization reaction the pH is kept between 11.0 and 8.8, the pH remains constant during the reaction within a range of variation of ±0.5 units, and a temperature difference between the start and end of the reaction of at least 10° C. is maintained.

14. A molded article comprising the composition of claim 1.

* * * * *